(12) United States Patent
Littlebrant

(10) Patent No.: US 7,647,947 B1
(45) Date of Patent: Jan. 19, 2010

(54) CASING SPACER

(75) Inventor: William C Littlebrant, Sandwich, IL (US)

(73) Assignee: Cascade Waterworks Manufacturing Co., Yorkville, IL (US)

( * ) Notice: Subject to any disclaimer, the term of this patent is extended or adjusted under 35 U.S.C. 154(b) by 0 days.

(21) Appl. No.: 12/245,539

(22) Filed: Oct. 3, 2008

(51) Int. Cl.
 *F16L 9/18* (2006.01)
(52) U.S. Cl. .................. 138/112; 138/159; 138/106
(58) Field of Classification Search ............. 138/112, 138/113, 156, 169, 160, 106
 See application file for complete search history.

(56) References Cited

U.S. PATENT DOCUMENTS

| | | | |
|---|---|---|---|
| 1,931,694 A | 10/1933 | Hall | 138/159 |
| 3,789,129 A | 12/1955 | Kennedy, Jr. | 138/113 X |
| 2,868,230 A | 1/1959 | Stokes | 138/113 |
| 2,890,724 A | 6/1959 | Kennedy, Jr. | 138/113 |
| 2,896,669 A | 7/1959 | Broadway et al. | 138/113 |
| 2,938,569 A | 5/1960 | Goodrich | 138/109 |
| 3,540,487 A | 11/1970 | LoRusso | 138/112 |
| 3,757,031 A * | 9/1973 | Izraeli | 174/138 F |
| 3,882,382 A | 5/1975 | Johnson | 138/104 |
| 3,996,414 A | 12/1976 | Artbauer et al. | 174/28 |
| 4,092,036 A | 5/1978 | Sato et al. | 285/337 |
| 4,095,041 A | 6/1978 | Netzel et al. | 138/114 X |
| 4,100,367 A | 7/1978 | Netzel | 138/113 X |
| 4,182,378 A * | 1/1980 | Dieter | 138/112 |
| 4,233,816 A | 11/1980 | Hensley | 138/112 X |
| 4,280,535 A | 7/1981 | Willis | 138/112 |
| 4,455,112 A | 6/1984 | Anders | 138/112 X |
| 4,627,774 A | 12/1986 | Bradley | 411/5 |
| 4,729,149 A * | 3/1988 | Brunkan | 16/252 |
| 4,779,900 A | 10/1988 | Shumard | 285/114 |
| 4,896,701 A | 1/1990 | Young | 138/108 |
| 4,896,903 A | 1/1990 | Shumard | 285/337 |
| 5,069,255 A | 12/1991 | Muszynski | 138/149 |
| 5,441,082 A | 8/1995 | Eskew et al. | 138/112 |
| 5,544,922 A | 8/1996 | Shumard et al. | 285/23 |
| 5,592,975 A | 1/1997 | Wissmann et al. | 138/112 |
| 5,628,599 A * | 5/1997 | Eakin | 411/163 |
| 5,915,911 A * | 6/1999 | Hodgetts | 414/527 |
| 5,934,334 A | 8/1999 | Gray et al. | 138/112 |
| 6,003,559 A | 12/1999 | Baker | 138/108 |
| 6,158,475 A * | 12/2000 | Clemmer | 138/112 |
| 6,161,589 A | 12/2000 | Bolotte et al. | 138/106 |
| 6,187,420 B1 * | 2/2001 | Tajima et al. | 428/213 |

(Continued)

OTHER PUBLICATIONS

Photographs of mounting bolts connected to casing spacer liner by weldments, Photographs taken Sep. 26, 2008.

*Primary Examiner*—Patrick F Brinson
(74) *Attorney, Agent, or Firm*—Wildman, Harrold, Allen & Dixon LLP

(57) ABSTRACT

A casing spacer includes a pair of generally semi-cylindrical metal shells disposed on opposed outer surface portions of a carrier pipe for securely maintaining the pipe in fixed, spaced relation from the inner surface of an outer casing. Opposed ends of the shells are connected together by nut and bolt combinations for securely attaching the casing spacer to the carrier pipe. Plural runners are directly attached in a spaced manner to the outer surfaces of the metal shells by respective nut and bolt combinations inserted through apertures in the casing spacer's metal shells for engaging the outing casing's inner surface in maintaining fixed spacing between the pipe and outer casing.

30 Claims, 3 Drawing Sheets

U.S. PATENT DOCUMENTS

| | | | |
|---|---|---|---|
| 6,571,832 B1 * | 6/2003 | Elliott | 138/108 |
| 6,736,166 B2 * | 5/2004 | Calais et al. | 138/112 |
| 6,896,004 B1 | 5/2005 | Witzel | 138/112 |
| 7,225,837 B1 * | 6/2007 | Kane | 138/112 |

* cited by examiner

CASING SPACER

FIELD OF THE INVENTION

This invention relates generally to fluid carrying pipes disposed in an outer casing and is particularly directed to a casing spacer of improved design which does not incorporate either risers or weldments for incorporating runners in the casing spacer for maintaining an inner carrier pipe in fixed position within, and in spaced relation from, an outer casing.

BACKGROUND OF THE INVENTION

Carrier pipes such as those used in water distribution systems are typically located underground and subjected to significant dynamic and static loads, corrosive elements, vibrations, and other destructive factors, particularly when located under roads and railway rights-of-way. As a result, these types of pipelines are frequently in the form of an inner liquid carrying pipe disposed within a rigid outer casing. The outer casing isolates the inner pipe from the elements as well as from ground movement and the structural stresses associated therewith. One or more carrier pipes may be disposed within the outer casing, where the inner carrier pipe(s) may be a water or sewer main. The outer casing serves to maintain carrier pipe alignment, restrain the carrier pipe against flotation or other movement, and maintain the carrier pipe in fixed position and orientation, such as for maintaining grade requirements in the case of a gravity sewer. One or more spacers are typically disposed about the carrier pipe(s) and between the carrier pipe(s) and the outer casing to maintain stationary positioning and fixed spacing of the carrier pipe(s) relative to the outer casing.

Early casing spacers made use of suitably sized lumber banded about selected portions of the carrier pipe before it is placed within the outer casing. The lumber tends to degrade over time and is subject to damage or destruction during installation. These wooden spacers are labor intensive to fabricate and attach to a carrier pipe and are positioned within an outer casing in a manner which tends to increase the possibility of damage or destruction of the casing spacer. These types of wooden spacers are also easily dislodged from the carrier pipe such as during installation and place an uneven load on the pipe unless the boards are spaced symmetrically about the inner carrier pipe. These wooden spacers are also subject to rot, allowing the carrier pipe to settle, or they can, on the other hand, swell and subject carrier pipe joints to breakage. These wooden spacers also provide only limited electrical insulation for the carrier pipe, and are subject to bacterial and differential oxygen concentration corrosion.

More recent casing spacer designs feature a preformed steel or plastic band tightly maintained in position about the outer surface of the carrier pipe. Attached to and extending from the outer surface of the casing spacer band are plural spaced risers. In the case of a steel casing spacer band, the risers are also comprised of steel and are attached to the casing spacer band by conventional means such as weldments. In the case of a plastic casing spacer band, the risers are also of plastic and are integrally formed with the band. A riser/runner arrangement disposed about the outer surface of the casing spacer's band provides this arrangement with a cross sectional shape generally in the shape of a "star". While the risers disposed on the outer surface of the casing spacer provide considerable strength in supporting a carrier pipe within the casing, this component substantially increases the cost and complexity of manufacture because it must be attached to the casing spacer's band in a separate step. Forming the riser integrally with the casing spacer band during manufacture also substantially increases the cost and complexity of casing spacer manufacture. Other casing spacer designs have eliminated the use of a riser by bolting the runners to the casing spacer's bands. These mounting bolts are attached to the casing spacer's bands by means of stud weldments. These stud weldments, as in the case of the aforementioned riser weldments, increase the complexity and cost of casing spacer manufacture. Once installed, the stud weldments are also subject to failure when subjected to the significant dynamic and static loads encountered in underground environments.

The present invention addresses the aforementioned limitations of the prior art by providing a casing spacer for maintaining a carrier pipe in spaced position within, and from, an outer casing which does not make use of risers or weldments for positioning and support of the carrier pipe. Plural runners are securely attached in a spaced manner directly to the outer surface of the casing spacer band in a novel mounted arrangement which eliminates the need for risers or weldments. The inventive riserless casing spacer is easily assembled and attached to a carrier pipe, is of reduced complexity and low cost, and provides secure support for a carrier pipe disposed within an outer casing.

SUMMARY OF THE INVENTION

Accordingly, one of the objects of the present invention is to provide an arrangement for securely maintaining a carrier pipe in fixed position within, and in space relation from, an outer casing.

Another object of the present invention is to provide a casing spacer for maintaining a carrier pipe in fixed position within an outer casing which eliminates the need for commonly used risers and weldments for incorporating runners in the casing spacer.

It is another object of the present invention to provide a casing spacer for use with a carrier pipe disposed in an outer casing which is easily manufactured, assembled and installed, includes a minimal number of parts, and is of reduced cost.

A further object of the present invention is to provide a casing spacer which includes neither risers nor weldments for incorporating runners in the casing spacer for use with a carrier pipe disposed in an outer casing which is easily field interchangeable with existing casing spacers having risers.

The present invention contemplates an arrangement for maintaining an inner pipe in fixed position within, and in space relation from, an outer casing, the arrangement comprising first and second metal shells disposed on opposed outer surface portions of the pipe; first and second coupling arrangements connecting adjacent ends of the first and second metal shells together for maintaining the metal shells in fixed position on the pipe; plural runners disposed about in and contact with the outer surfaces of the first and second shells, wherein at least some of the runners engage in inner surface of the outer casing for maintaining the pipe in fixed position within, and in space relation from, the outer casing; and plural couplers inserted through respective apertures in the first and second shells and connected to a respective runner for maintaining the runners in fixed position on the first and second shells.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like-referenced characters identify like elements throughout the various figures, in which:

DETAILED DESCRIPTION OF THE PREFERRED EMBODIMENTS

Figure 1:
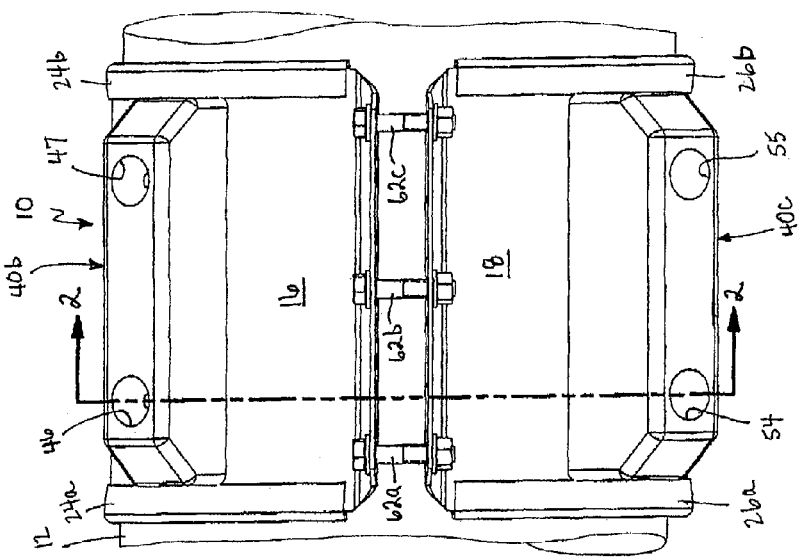
FIG. 1 is a side elevation view of a novel casing spacer attached to a carrier pipe in accordance with the present invention.
Figure 2:
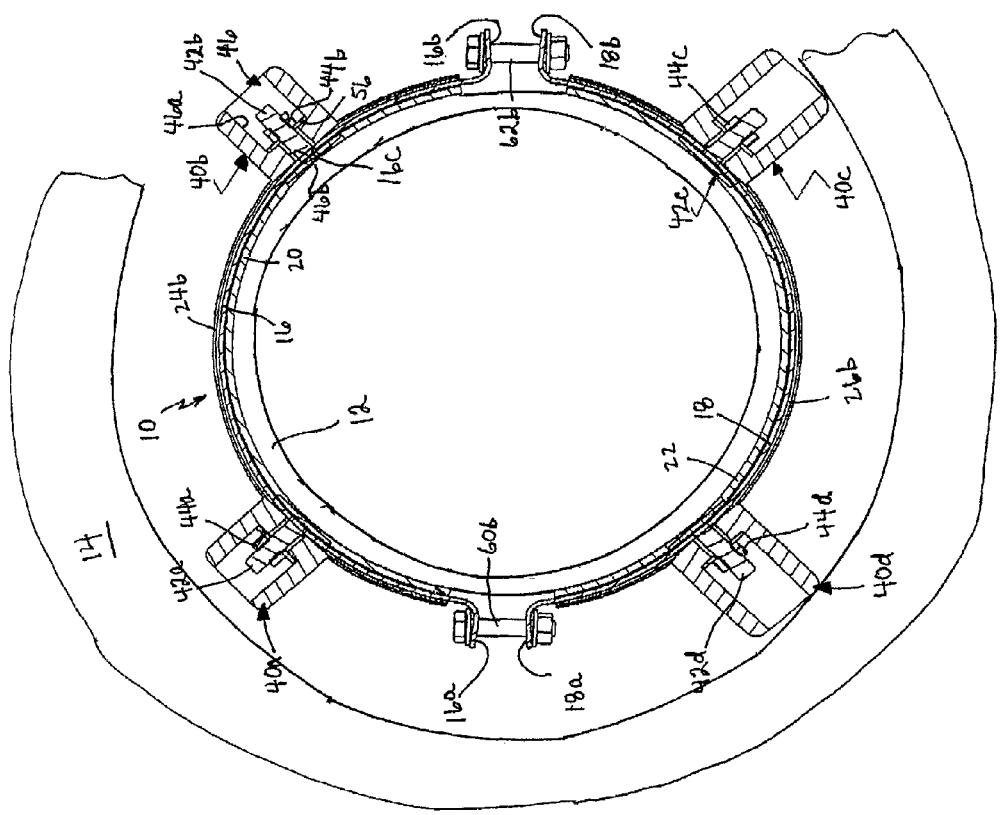
FIG. 2 is a sectional view of the novel casing spacer attached to a carrier pipe shown in FIG. 1 taken along site line 2-2 therein.
Figure 4:
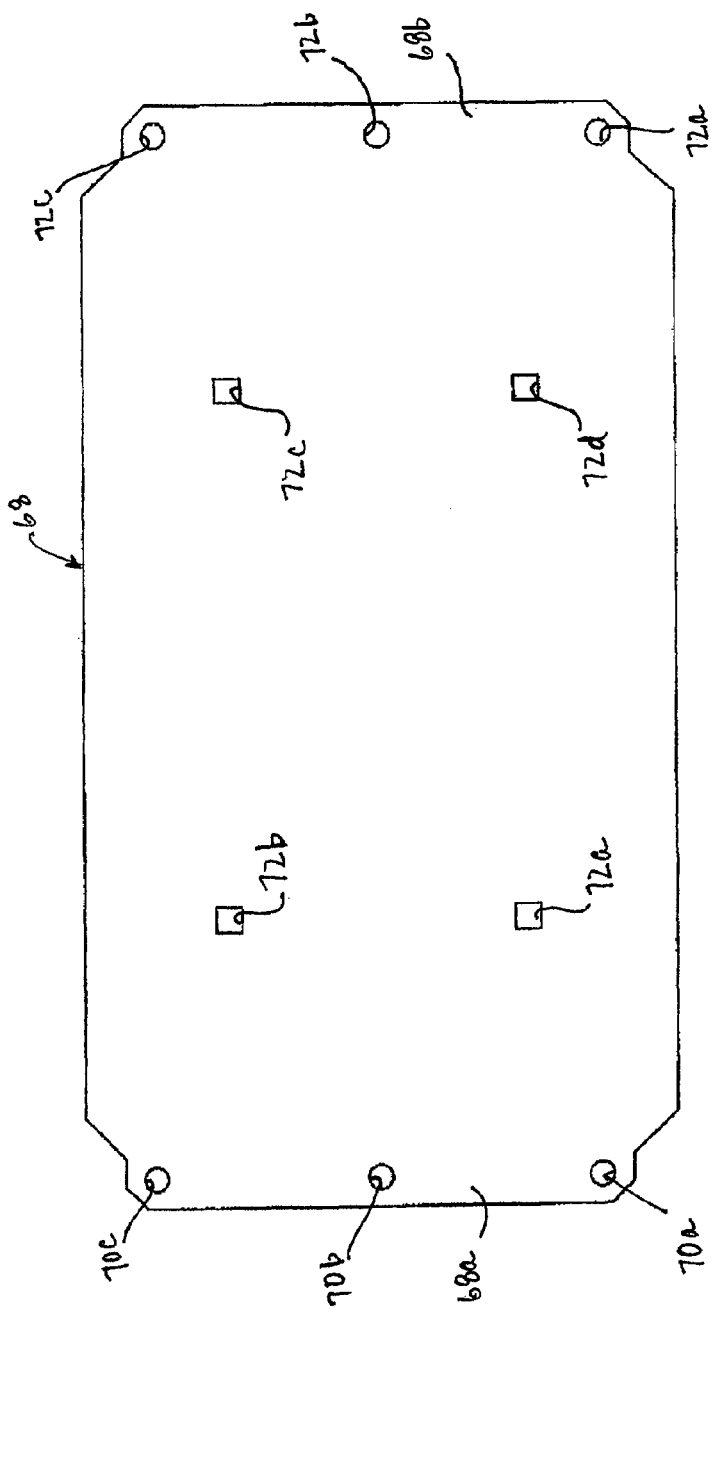
FIG. 4 is a plan view of a metal shell, which when connected together with another similarly configured metal shell, forms the casing spacer of the present invention.
Figure 3:
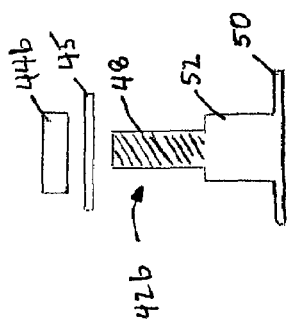
FIG. 3 is a side elevation view of a connector arrangement for attaching plural spaced runners about the outer surface of a casing spacer in accordance with a preferred embodiment of the present invention.
Figure 5:
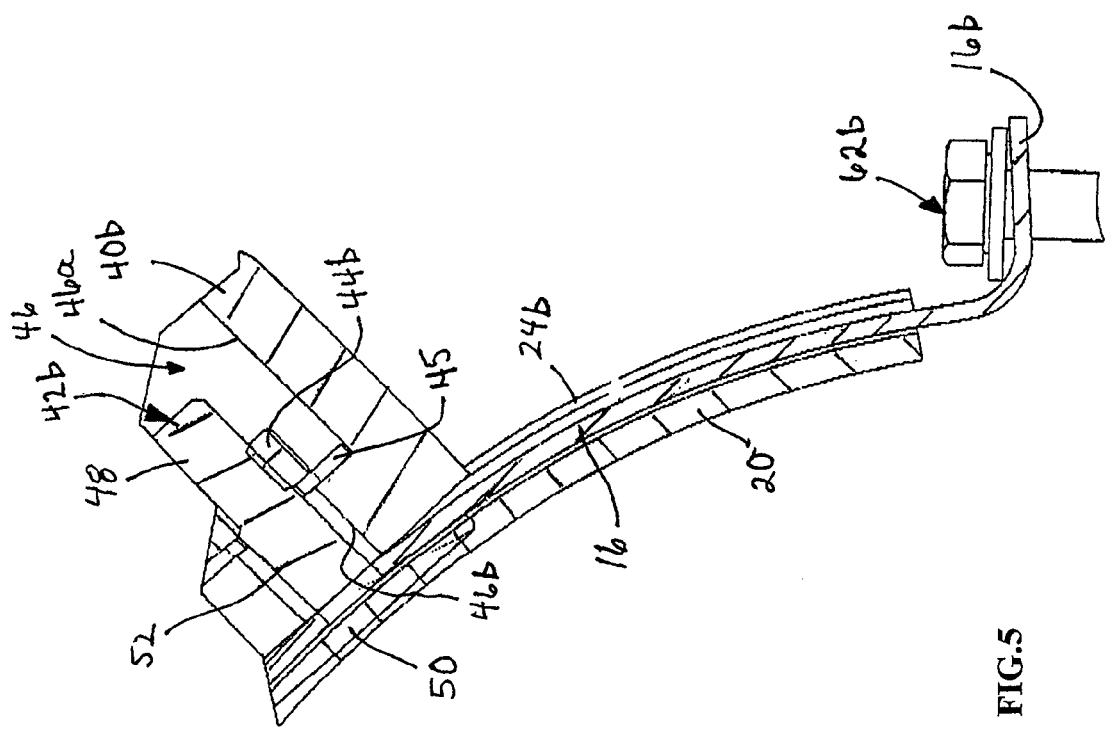
FIG. 5 is an enlarged sectional view of a portion of the inventive casing spacer showing details of the attachment of a runner to a metal shell of the casing spacer without using a riser or weldment.

Referring to FIG. 1, there is shown a side elevation view of a novel casing spacer 10 positioned on a carrier pipe 12 in accordance with the principles of the present invention. A sectional view of the casing spacer 10 and carrier pipe 12 combination taken along site line 2-2 of FIG. 1 is shown in FIG. 2. FIG. 2 also includes an outer casing 14 disposed about the casing spacer 10 and carrier pipe 12 combination. FIG. 3 is a side elevation view of an elevator bolt 42b used in the present invention as described in detail below. FIG. 4 is a plan view of a casing spacer shell 68 showing additional details of the present invention. Finally, FIG. 5 is an enlarged sectional view of a portion of the inventive casing spacer illustrating details of the attachment of a runner 40b to a metal shell 16 of the casing spacer 10 without the use of a riser.

Casing spacer 10 includes first and second casing spacer shells 16 and 18. Each of the first and second casing spacer shells 16, 18 is generally semi-cylindrical in shape and are adapted for coupling together to form a generally cylindrical structure adapted for secure and fixed positioning on a carrier pipe 12. Each of the first and second casing spacer shells 16, 18 is preferably comprised of T-304 stainless steel or galvanized steel having a minimum 14 gauge thickness. The inner surfaces of each of the first and second casings spacer shells 16, 18 are lined with respective first and second polyvinylchloride (PVC) liners 20 and 22 which engage the outer surface of carrier pipe 12. Each of the first and second PVC liners 20, 22 is formed by extrusion, has a preferred thickness of 0.09", and is provided with plural spaced ribs. In addition, the first liner 20 is provided with first and second end portions 24a and 24b, while the second liner 22 is provided with third and fourth end portions 26a and 26b. The first and second end portions 24a, 24b of the first liner 20 are wrapped around opposed lateral edges of the first casing spacer shell 16. Similarly, the third and fourth end portions of the second liner 22 are wrapped around opposed lateral edges of the second casing spacer shell 18. The composition and positioning of the first and second liners 20, 22 prevents slippage of the first and second casing spacer shells 16, 18 on carrier pipe 12.

Disposed on opposed ends of the first casing spacer shell 16 are first and second end flanges 16a and 16b. Similarly, disposed on opposed ends of the second casing spacer shell 18 are third and fourth end flanges 18a and 18b. Each of these end flanges of the first and second casing spacer shells 16, 18 is provided with plural spaced apertures along their respective lengths. Aligned apertures in each of the adjacent pairs of end flanges of the first and second casing shells 16, 18 are adapted to receive a respective connector arrangement, such as the combination of a nut and bolt and possibly one or two washers. Thus, three apertures in the second end flange 16b of the first casing spacer shell 16 are aligned with three apertures in the fourth end flange 18b of the second casing spacer shell 18. Similarly, three apertures in the first end flange 16a of the first casing spacer shell 16 are aligned with three respective apertures in the third end flange 18a of the second casing spacer shell 18. Each of the aligned pairs of apertures is adapted to receive a nut and bolt combination for securely maintaining the first and second casing spacer shells 16, 18 in tight engagement with and fixed position on carrier pipe 12. Thus, as shown in FIG. 1, first, second and third nut and bolt combination 62a, 62b and 62c are inserted through aligned pairs of apertures in each of in the second end flange 16b of the first casing spacer shell 16 and in the fourth end flange 18b of the second casing spacer shell 18. A similar connecting arrangement is disposed on the opposed ends of the first and second casing spacer shells 16, 18 as shown in FIG. 2, where the middle nut and bolt combination 60b is shown connecting the first end flange 16a of the first casing spacer shell 16 with the third end flange 18a of the second casing spacing shell 18. As shown in the various figures, the end flanges of each of the first and second casing spacing shells 16, 18 are preferably formed integrally with the main portion of the casing spacer shell such as by bending the casing spacer shell.

Each of four runners 40a-40d is mechanically bolted to one of the first or second casing spacer shells 16, 18 at appropriate positions to properly support the carrier pipe 12 within the outer casing 14 and to facilitate installation. Each of the four runners 40a-40d is preferably comprised of an ultra high molecular weight (UHMW) polyethylene to provide abrasion resistance and a low coefficient of friction, i.e., on the order of 0.12. Standard positioning within outer casing 14 is sized such that the carrier pipe 12 rests near the bottom inner portion of outer casing 14. The height of the runners 40a-40d preferably provides a bottom clearance not less than ½" between the casing pipe and the extreme outer diameter of a connecting joint between adjacent sections of carrier pipe. The height dimensions of the runners 40a-40d is also such that the height of the runners center carrier pipe 12 within outer casing 14, with a top clearance of ¾" minimum.

Each of the four runners 40a-40d is generally elongated and linear in shape and includes a pair of apertures disposed along its length. Thus, as shown in FIG. 1, second runner 40b includes spaced apertures 46 and 47. Similarly, third runner 40c includes a pair of spaced apertures 54 and 55 also as shown in FIG. 1. The first and fourth runners 40a and 40d are shown in the sectional view of FIG. 2 as including first respective apertures therein, with the second apertures in each of these runners not shown in the figures for simplicity. Referring specifically to the first aperture 46 in the second runner 40b, it can be seen that this aperture includes an enlarged distal portion 46a and a reduced proximal portion 46b. Each of the distal and proximal portions 46a and 46b of aperture 46 in runners 40b are generally circular in cross section. The proximal portion 46b of aperture 46 is aligned with a generally square aperture 16c in the first casing spacer shell 16 in this embodiment of the invention. Inserted through apertures 16c in casing spacer shell 16 and aperture 46 in runner 40b is an elevator bolt 42b. A side elevation view of elevator bolt 42b is shown in FIG. 3. Elevator bolt 42b is comprised of a disc-like base 50 and a elongated shaft having an outer threaded portion 48 and a inner square portion 52 integrally formed with the bolt's base. While the inner portion 52 of the bolt's shaft is shown as being square in shape, this part of the bolt is not limited to having four sides and may have a larger number of sides such as 6 or 8. Bolt 42b is formed by conventional means and is unitary in structure. Bolt 42b is inserted through aperture 16c in the first casing spacer shell 16 prior to positioning of the first liner 20 on the inner surface of the casing spacer shell. Thus, the bolt's base 50 is disposed between first liner 20 and the inner surface of the first casing shell 16. The combination of a washer 56 and a nut 44b is adapted for positioning on the threaded distal portion 48 of bolt 42b. By tightening nut 44b on bolt 42b, the second runner 40b may be securely attached to the outer surface of the first casing shell 16. The enlarged distal portion 46a of aperture 46 in runner 40b is adapted to receive the nut 44b and washer 56 combination and to facilitate tightening of the nut such as by a socket wrench. Nuts 44a, 44c and 44d are respectively attached to bolts 42a, 42c, and 42d for securely attaching first, third, and fourth runners 40a, 40c and 40d to the outer surface of the first shell 16 of riserless casing spacer 10.

Referring to FIG. 4, there is shown a plan view of one embodiment of a casing spacer shell 68 for use in the present invention. Casing spacer shell 68 is shown in a generally flat configuration, prior to its bending in a generally cylindrical shape for positioning on a carrier pipe. Casing spacer shell 68 includes first and second end flanges 68a and 68b each having respective plural spaced apertures therein for receiving nut and bolt connecting combinations. Thus, first end flange 68a includes three spaced aligned apertures 70a, 70b and 70c and second end flange 68b includes three spaced, aligned apertures 72a, 72b and 72c. Casing spacing shell 68 further includes four spaced inner apertures 72a-72d arranged in a generally rectangular array in the casing spacing shell. Each of the inner apertures 72a-72d is provided with a generally square shape and is adapted to receive in tight-fitting engagement an elevator bolt (not shown) having a shaft with a square inner portion as described above for the four elevator bolts 42a-42d and as more particularly shown in FIG. 3 for elevator bolt 42b. By keying the shape of the spaced apertures in a casing spacer shell with the shape of the inner portion of the shaft of a elevator bolt, installation and secure mounting of a runner on a casing spacer is facilitated. As stated above, the inner apertures in a casing spacer shell are not limited to having a square shape, but may have any number of sides, provided that the matching elevator bolt is provided with the same number of lateral sides and is sized so as to snuggly fit within the casing spacer shell aperture to prevent rotation of the elevator bolt during tightening of a mounting bolt thereon. The semi-cylindrical casing spacer shell's inner apertures are preferably located 45° or 30° from the shell's center-line.

While particular embodiments of the present invention have been described, it will be obvious to those skilled in the relevant arts that changes and modifications may be made without departing from the invention in its broader aspects. For example, connector-mounting aperture keying arrangement and component compositions other than those described herein may be known to those skilled in the relevant arts. These alternative embodiments are included herein by reference and are covered by the following claims. Therefore, the aim in the appended claims is to cover all such changes and modifications that all within the true spirit and scope of the invention. The matters set forth in the foregoing description and accompanying drawings is offered by way of illustration only and not as a limitation. The actual scope of the invention is intended to be defined in the following claims when viewed in their proper perspective based on the prior art.

I claim:

1. An arrangement for maintaining an inner pipe in fixed position within, and in spaced relation from, an outer casing, said arrangement comprising:
   first and second metal shells disposed on opposed outer surface portions of the pipe;
   first and second coupling arrangements connecting adjacent ends of said first and second metal shells together for maintaining said metal shells in fixed position on the pipe;
   plural runners disposed about and in contact with the outer surfaces of said first and second shells, wherein at least some of said runners engage an inner surface of the outer casing for maintaining the pipe in fixed position within, and in spaced relation from, the outer casing; and
   plural couplers inserted through respective apertures in said first and second shells and connected to a respective runner for maintaining said runners in fixed position on said first and second shells.

2. The arrangement of claim 1 wherein each of said couplers includes a nut and bolt combination.

3. The arrangement of claim 2 wherein said first and second shells include respective plural apertures therein, and wherein each bolt is inserted through a respective aperture in one of said shells.

4. The arrangement of claim 3 wherein each bolt and aperture is sized and shaped so that a bolt is maintained within an associated aperture in a fixed, non-rotating manner.

5. The arrangement of claim 4 wherein each bolt has an outer peripheral portion complementary to the size and shape of an associated aperture in one of said shells, and wherein rotation of said bolt is prevented by an associated engaging aperture when an associated nut is threadably positioned and tightened on said bolt.

6. The arrangement of claim 5 wherein the outer peripheral portion of each bolt and an associated aperture are four-sided.

7. The arrangement of claim 6 wherein the outer peripheral portion of each bolt and an associated aperture are square.

8. The arrangement of claim 5 wherein the outer peripheral portion of each bolt and an associated aperture is six-sided or eight-sided.

9. The arrangement of claim 4 wherein each bolt includes a threaded portion and a head portion disposed of the opposed ends of said bolt and an intermediate portion sized and shaped so as to be positioned within an associated aperture in a fixed, non-rotating manner.

10. The arrangement of claim 9 wherein the intermediate portion of each bolt is complementary to the size and shape of an associated aperture in one of said shells, and wherein rotation of said bolt is prevented by an associated engaging aperture when a nut is threadably positioned and tightened on said bolt.

11. The arrangement of claim 10 wherein an outer peripheral portion of each bolt and an associated aperture is four-sided.

12. The arrangement of claim 11 wherein an outer peripheral portion of each bolt and associated aperture is square.

13. The arrangement of claim 10 wherein an outer peripheral portion of each bolt and associated aperture is six-sided or eight-sided.

14. The arrangement of claim 9 wherein the head portion of said bolt is generally flat and is disposed intermediate the carrier pipe and a metal shell.

15. The arrangement of claim 14 further comprising first and second liners respectively disposed on the inner surfaces of said first and second shells, and wherein the head portion of each bolt is disposed in contact with and intermediate a shell and a liner disposed on said shell.

16. The arrangement of claim 15 wherein each liner extends substantially between first and second opposed ends of an associated shell.

17. The arrangement of claim 16 wherein first and second liners are comprised of PVC.

18. The arrangement of claim 16 wherein each liner is on the order 0.09 inch thick.

19. The arrangement of claim 15 wherein each liner includes respective first and second opposed edge portions wrapped around respective opposed edges of an associated shell.

20. The arrangement of claim 3 wherein each runner includes at least one aperture adapted to receive an associated bolt, and wherein said at least one aperture includes a distal enlarged portion adapted to receive an associated nut coupled to said bolt.

21. The arrangement of claim 20 wherein each of said runners is linear and elongated and extends substantially the width of an associated shell.

22. The arrangement of claim 21 wherein each runner is comprised of polyethylene.

23. The arrangement of claim 22 wherein each runner is comprised of ultra-high-molecular-weight polyethylene.

24. The arrangement of claim 23 wherein each runner has a low coefficient of friction.

25. The arrangement of claim 24 wherein each runner has a coefficient or friction of 0.12.

26. The arrangement of claim 1 wherein said runners maintain spacing between the carrier pipe and a bottom portion of the outer casing of at least ½" and a top portion of the outer casing of at least ¾".

27. The arrangement of claim 1 wherein said first and second metal shells are comprised of stainless steel or galvanized steel.

28. The arrangement of claim 1 wherein said first and second coupling arrangements include respective first and second plural nut and bolt combinations, and wherein said first nut and bolt combination is inserted through first plural aligned apertures for coupling adjacent first ends of said first and second metal shells and said second nut and bolt combinations are inserted through second plural aligned apertures for coupling adjacent second ends of said first and second metal shells.

29. The arrangement of claim 1 wherein said plural couplers are inserted through apertures in said first and second shells and wherein said apertures are disposed approximately 45° or 30° from the shell's vertical centerline.

30. The arrangement of claim 1 wherein each of said first and second metal shells is generally semi-cylindrical in shape.

* * * * *